United States Patent
Goder

(10) Patent No.: US 6,426,886 B1
(45) Date of Patent: Jul. 30, 2002

(54) OVERCURRENT PROTECTION FOR A LINEAR POST-REGULATOR USED IN A VOLTAGE CONVERTER SYSTEM

(75) Inventor: Dimitry Goder, San Jose, CA (US)

(73) Assignee: Switch Power, Inc., Campbell, CA (US)

( * ) Notice: Subject to any disclaimer, the term of this patent is extended or adjusted under 35 U.S.C. 154(b) by 0 days.

(21) Appl. No.: 09/921,725

(22) Filed: Aug. 3, 2001

(51) Int. Cl.[7] .................. H02H 7/122; H02M 3/335
(52) U.S. Cl. ................. 363/56.1; 363/21.18
(58) Field of Search ............ 363/16, 20, 21.01, 363/21.1, 21.12, 21.18, 55, 56.01, 56.09, 56.1, 95, 97, 131

(56) References Cited

U.S. PATENT DOCUMENTS 5,119,284 A * 6/1992 Fisher et al. .................. 363/48
5,122,945 A * 6/1992 Marawi ........................ 363/21
5,684,679 A * 11/1997 Hong ........................... 363/21
5,949,658 A * 9/1999 Thottuvelil et al. ........... 363/15

* cited by examiner

Primary Examiner—Matthew Nguyen
(74) Attorney, Agent, or Firm—Dorsey & Whitney LLP

(57) ABSTRACT

A generic voltage converter outputs at least two voltages: a Vo potential that is regulated using output-to-input feedback to a PWM that controls duty cycle of the converter switch, and a VoAUX potential available from a post-linear regulator. Output-to-input feedback is provided from the post-linear regulator to a node in the PWM, e.g., COMP, SoftStart, VFB. Whenever the post-linear regulator senses excessive VoAUX current, feedback from the regulator commands the PWM to reduce converter duty cycle, which reduces VinAUX, as well as VoAUX and Vo, without cross-regulation. The topology minimizes thermal dissipation within the regulator pass element by saturating the pass element at maximum VoAUX current flow such that at maximum current flow there is minimal voltage drop across the pass element.

20 Claims, 4 Drawing Sheets

OVERCURRENT PROTECTION FOR A LINEAR POST-REGULATOR USED IN A VOLTAGE CONVERTER SYSTEM

FIELD OF THE INVENTION

The present invention relates generally to voltage converters that output multiple voltages, and more particularly to protecting a linear post-regulator used in such a converter against an overcurrent condition.

BACKGROUND OF THE INVENTION

As herein relevant, a voltage or power converter is a circuit or system that receives an input voltage (Vin) that is AC in an AC:DC voltage converter, or DC in a DC:DC voltage converter, and generates at least two voltages that are provided as rectified DC outputs (Vo, VoAUX). Typically the Vo voltage is sampled and fed back to the voltage feedback node (VFB) of a pulse width modulator (PWM) whose output can control magnitude of Vo. However the VoAUX voltage is neither sampled or used to control the PWM, nor otherwise voltage regulated. Instead, a linear regulator is used between the relevant converter output and the VoAUX node as a post-regulator.

Such converters may be implemented in a variety of topologies. By way of example, FIG. 1A depicts a prior art isolation-providing DC:DC voltage converter 10. Converter 10 provides isolation in that the input ground is separate from the output ground. However for use with the present invention, it is not critical whether a converter does or does not provide isolation.

In the exemplary topology of FIG. 1A, converter 10 receives a source of input potential Vin on the system input side 20, and converts Vin to a Vo potential and a VoAUX potential on the system output side 30. Loads will be coupled between the Vo node and output-side ground, and between the VoAUX node and output-side ground. Other systems 10 could of course generate more than two output voltages, and if system 10 were an AC:DC converter, then Vin could represent a raw input AC voltage that has been rectified to yield Vin. As noted, while FIG. 1A shows an isolating converter having separate input-side ground and output-side ground, converter 10 is merely exemplary, and could in fact be non-isolating, with a common ground for the system input-side and output-side.

In the exemplary topology of FIG. 1A, transformer T1 provide isolation between the input and output sides of system 10, as does isolator unit 11. Transformer T1 typically comprises at least one primary winding W1 and at least one secondary winding W2, shown here as being tapped, from which raw output voltages Vo and VinAUX will be provided. The input side of converter 10 includes a switch Q1 coupleable in series between one end primary transformer winding W1 and input-side ground (or other input-side reference potential). If additional primary side windings are present, each such winding could also have a switch, and be similarly coupleable. However, it is not required that converter 10 provide isolation, in which case I1 could be omitted, and input side ground and output side ground would be a common ground.

Referring to FIG. 1A, in a fashion well known to those skilled in the relevant art, switch Q1 opens and closes upon receipt of drive signal from a drive circuit 40. In turn, circuit 40 outputs the drive signal in response to input signals from a pulse width modulator (PWM) 50 that operates preferably in response to a feedback sample (k·Vo) taken from output voltage Vo, e.g., via resistor string R1 and R2. Voltage Vo is output from a rectifier circuit, here shown as a simple diode-capacitor, D1 and C1. Commonly the k·Vo sample is coupled to a voltage feedback node (VFB) on PWM 50. A source of Vbias (not shown) is coupled to provide operating potential for PWM 50.

In operation, the k·Vo sample at the VFB node is compared within PWM 50 to a stable reference voltage (not shown). PWM 50 then generates an appropriate correction signal based upon the voltage difference between k·Vo and the reference potential. The correction signal is suitably coupled, e.g., via an isolator I1 if required, to driver 40 to command switch Q1 in a corrective fashion. For example, if PWM 50 determines that Vo is too low, the correction signal from the PWM can cause switch Q1 to turn-on with increased pulse width, to increase duty cycle and thus magnitude of Vo. Or, if the PWM determines that Vo is too high, the PWM will cause drive circuit 40 to turn-on Q1 with decreased pulse width, to decrease duty cycle and thus magnitude of Vo.

When switch Q1 turns-on, Vin is impressed across input winding W1, and essentially Vin is sampled or chopped. The resultant chopped signal is inductively coupled via transformer T1 to the secondary transformer winding W2. On the output side of system 10, diode D2 and capacitor C2 filter the chopped AC to yield raw potential VinAUX, which is coupled as input to a post-linear regulator circuit 60 to yield VoAUX. Internal to regulator 60 is a feedback loop 70 that is used to limit the maximum current available from the VoAUX node.

System 10 in FIG. 1A is typical of many prior art converters in that the Vo voltage can be well regulated by feedback to the PWM, but there is no real regulation of the potential VoAUX, only a limit as to maximum current at the VoAUX node. For example, the PWM may control magnitude of Vo to within about ±2%, whereas VinAUX may vary ±5% to ±10% or so, as the magnitude of Vin andlor loads on either output node vary. Generally there is but one PWM in a converter system, and the VoAUX node simply is not voltage regulated using PWM feedback. A post-linear regulator can regulate VoAUX to within about ±2%. But protecting post-regulator 60 against thermal overload can be a challenge, especially if regulator 60 is implemented with discrete components, rather than as a single IC. For example, if the load resistance $LOAD_{AUX}$ becomes too low, or even a short circuit, regulator 60 must stand-off a voltage differential of (VinAUX–0) and a maximum value of load current $I_{AUX}$. The pass device must dissipate the power equal to the product of the stand-off voltage and maximum current, and can readily be damaged. Some prior art topologies include current foldback to reduce magnitude of output current under short-circuit load conditions, but such topologies still do not use input-to-output feedback to voltage regulate the VoAUX node potential.

FIG. 1B depicts an exemplary linear post-regulator 60, a circuit that will be coupled in series between VinAUX and VoAUX to limit the maximum permissible load current ($I_{Aux}$) available to $LOAD_{AUX}$. Regulator 60 includes a pass element, here a bipolar transistor $Q_{pass}$ used as an emitter follower, coupled in series with a current sensor 70, through which current $I_{AUX}$ passes.

Regulator 60 further includes a first amplifier 80 that compares a sensor 70 measure of $I_{AUX}$ with a reference voltage 90 representing a maximum threshold current. Regulator 60 also includes a second amplifier 100 that compares a measure of VoAUX potential to a reference potential 110. A feedback loop 120 is provided such that the magnitude of the input or control signal to pass element $Q_{pass}$ is a function of the magnitude of sensed current $I_{AUX}$. In the example shown in FIG. 1B, Q1 is a bipolar transistor whose input signal is the base-emitter drive voltage established by amplifier 100. If sensor 70 determines that $I_{AUX}$ is exceeding a threshold set by reference 90, the effect of the feedback in the regulator is to decrease the $Q_{pass}$ base-emitter voltage, thus decreasing collector and emitter current, or $I_{AUX}$. Diode Dr in feedback loop 120 protects amplifiers 80 and 100 from damage from each other's output signals.

An exemplary current sensor 70 is shown in FIG. 1C. Sensor 70 can include a small impedance sense resistor Rs across which $I_{AUX}$ creates a voltage drop proportional to Rs·$I_{AUX}$. This potential is sensed with a differential amplifier Ae whose output is coupled to amplifier 100. If $I_{AUX}$ increases sufficiently, the output signal from the error amplifier Ae will exceed the threshold level set by reference 90, whereupon $Q_{pass}$ will receive less base-emitter drive. It is understood that FIG. 1C is exemplary and current flow $I_{AUX}$ can be sensed using other circuits and other techniques.

As noted above, post-linear regulator 60 can indeed limit the magnitude of the output current $I_{AUX}$. But under worst case conditions, if $LOAD_{AUX}$ resistance is very small or even zero, $Q_{pass}$ will be required to safely dissipate power equal to $VinAUX·I_{Aux}$. By way of example, if VinAUX is 70 V and VoAUX is nominally 60 V with $I_{AUX}≈1$ A, under normal conditions $Q_{pass}$ will dissipate 10 W, e.g., the product of 10 V and 1 A. But under short-circuit output load conditions, $Q_{pass}$ will be required to dissipate approximately 70 W, e.g., (70 V–0V)·1 A. If post-regulator 60 is fabricated on a single integrated circuit (IC) die, reasonably adequate thermal protection can often be provided. But in many converter systems, the post-regulator will be implemented with discrete components and it can be difficult to adequately protect the pass element against thermal stress due to a short circuit or very low $LOAD_{AUX}$ resistance.

Thus, for use with a converter that outputs at least two voltages, one of which is voltage-regulated with a PWM and feedback, and one of which simply has a linear post-regulator to limit current, there is a need for a topology that provides some measure of feedback voltage regulation for the current limited node. Further, there is a need to protect even a discretely implemented post-linear regulator with thermal protection, preferably such that the regulator pass element dissipates minimum rather than maximum power under short circuit load conditions to that node.

The present invention provides such topology.

SUMMARY OF THE INVENTION

As noted, prior art voltage converters that output Vo and VoAUX provide output-to-input PWM system feedback to regulator voltage at the Vo output node, but use only a post-regulator with local feedback to limit current delivered from the VoAUX node, and do not control VoAUX with output-to-input feedback. By contrast, the present invention regulates the Vo output node with similar output-to-input PWM system feedback, but also regulates potential at the VoAUX node using feedback from a linear post-regulator to a node of the same PWM. The linear post-regulator, which is in series between the converter VinAUX node and the VoAUX node, limits output current from the VoAUX node and is protected by topology according to the present invention against excessive dissipation under short-circuit load condition. When excessive current is drawn from the VoAUX node, feedback from the post regulator to the PWM causes a reduction in output voltage at the Vo node and at the VinAUX node. However as the VoAUX node current reduces to an acceptable level, feedback from the post-linear regulator to the PWM reduces, until the PWM is relatively unaffected by feedback from the regulator. Converter topology according to the present invention is such that when current drawn from the VoAUX node exceeds a maximum current level, dissipation across the linear post-regulator is actually at a minimum. Thus, thermal protection is provided even if the linear post-regulator is implemented with discrete components.

When the current drawn from the VoAUX node is excessive (e.g., exceeds a predetermined threshold) and requires limiting, the linear post-regulator provides feedback to at least one input node of the same PWM that provides output-to-input feedback control over the Vo node voltage. Feedback from the post-linear regulator can go to the PWM COMP node, the SoftStart node, the VFB node, among other PWM nodes. This PWM feedback will reduce the VinAUX node potential, and also VoAUX and Vo potential.

In the present invention, when maximum current limiting occurs in the linear post-regulator, the regulator pass device is operated at or close to saturation. As a result, although the pass device now conducts the maximum limit current, the voltage across the input-output terminals of the device (e.g., collector-to-emitter for a bipolar device) is at a minimum, e.g., Vce sat. The product of the maximum current and the low saturation voltage represents a low level of dissipation that the pass device can safely handle. Indeed, thermal dissipation in the regulator pass device is actually least when current limiting is invoked, due to saturation mode operation of the pass device.

Other features and advantages of the invention will appear from the following description in which the preferred embodiments have been set forth in detail, in conjunction with the accompanying drawings.

DETAILED DESCRIPTION OF THE PREFERRED EMBODIMENTS

Figure 1A:
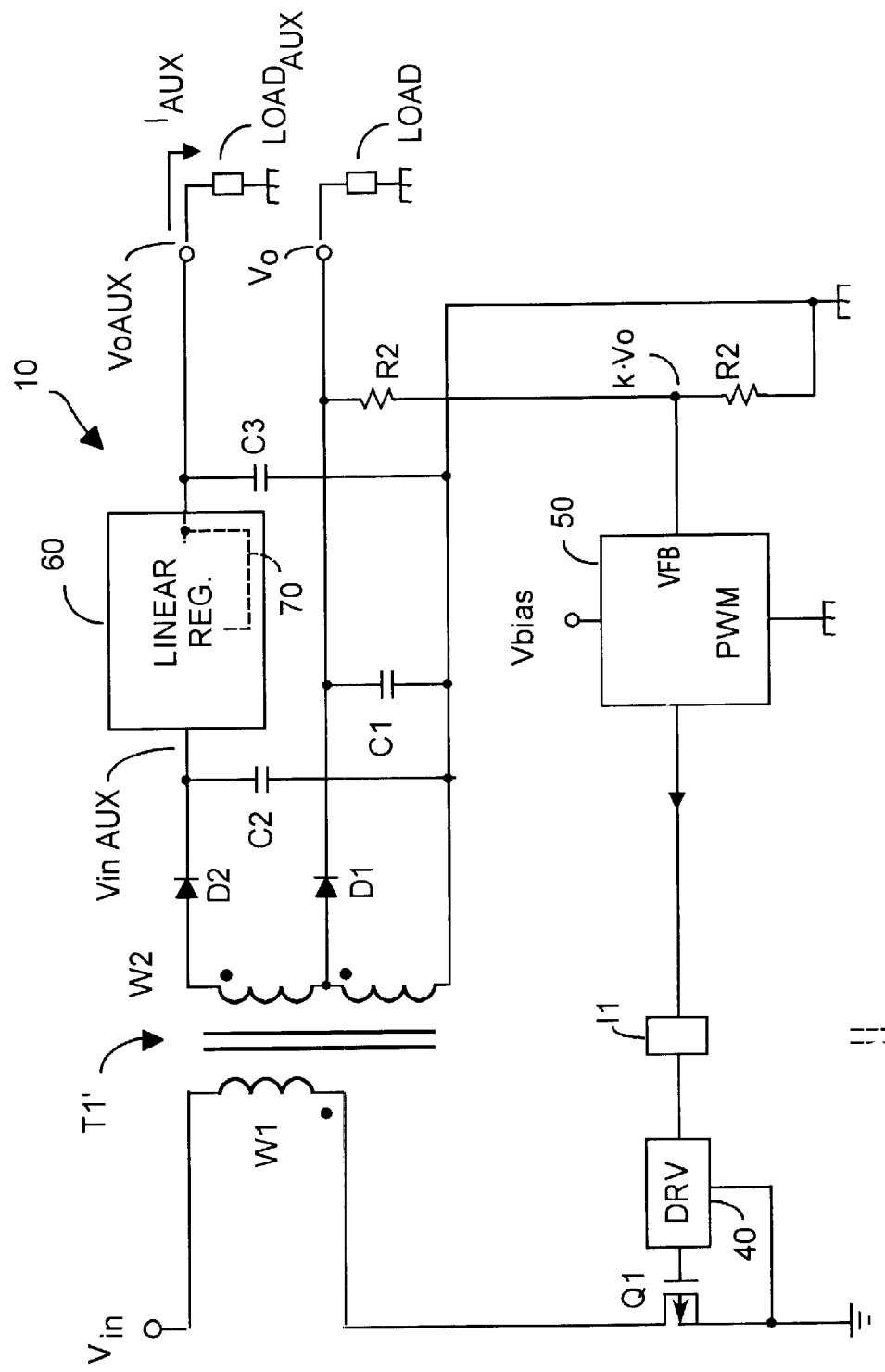
FIG. 1A depicts a voltage converter system with a post-linear regulator with internal feedback to current-limit output at a VoAUX node, according to the prior art.
Figures 1B, 1C:
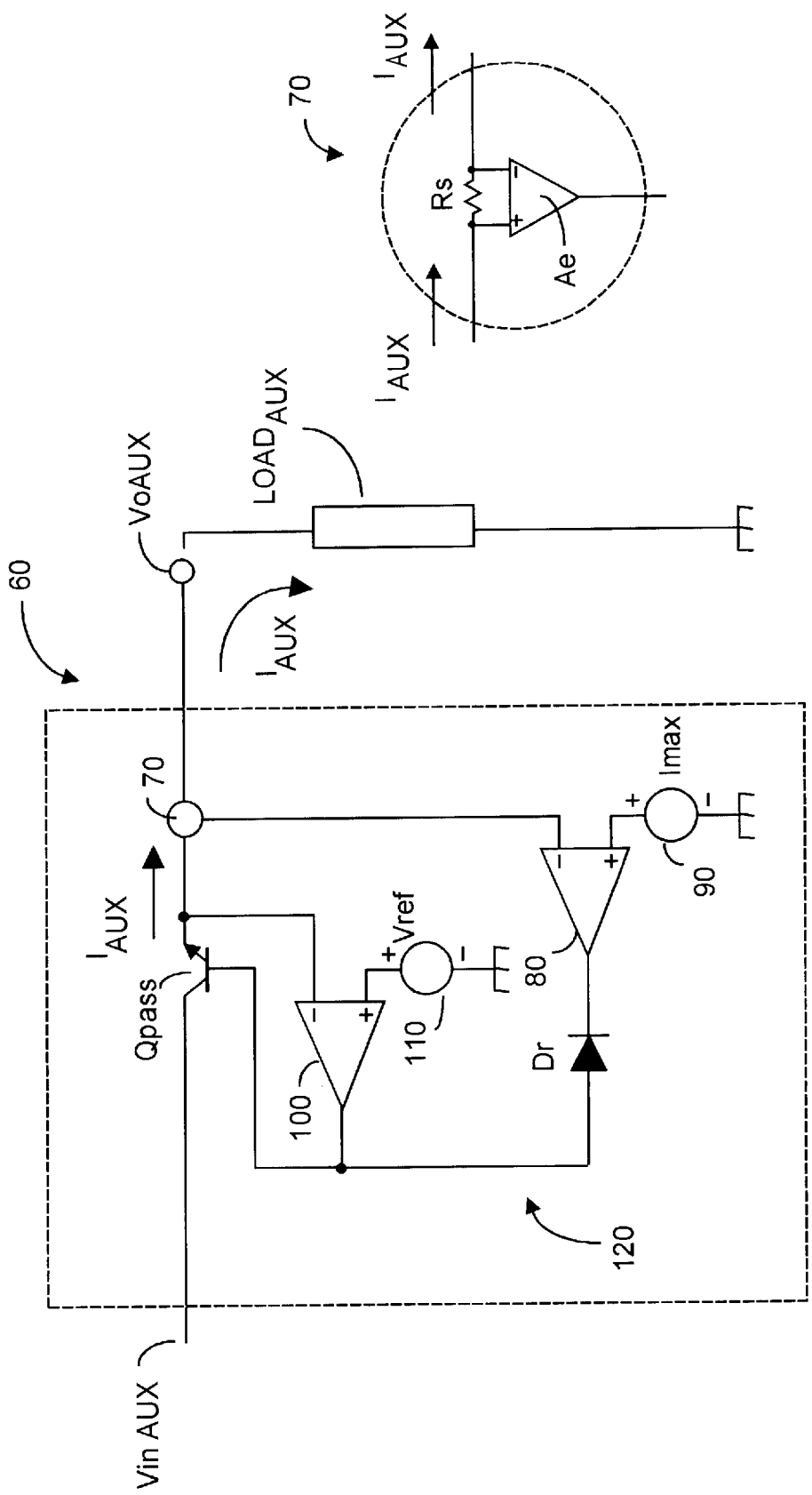
FIG. 1B depicts a generic post-linear regulator such as may be used with the system of FIG. 1A, according to the prior art.
FIG. 1C depicts an exemplary current sensor, according to the prior art.
Figure 2A:
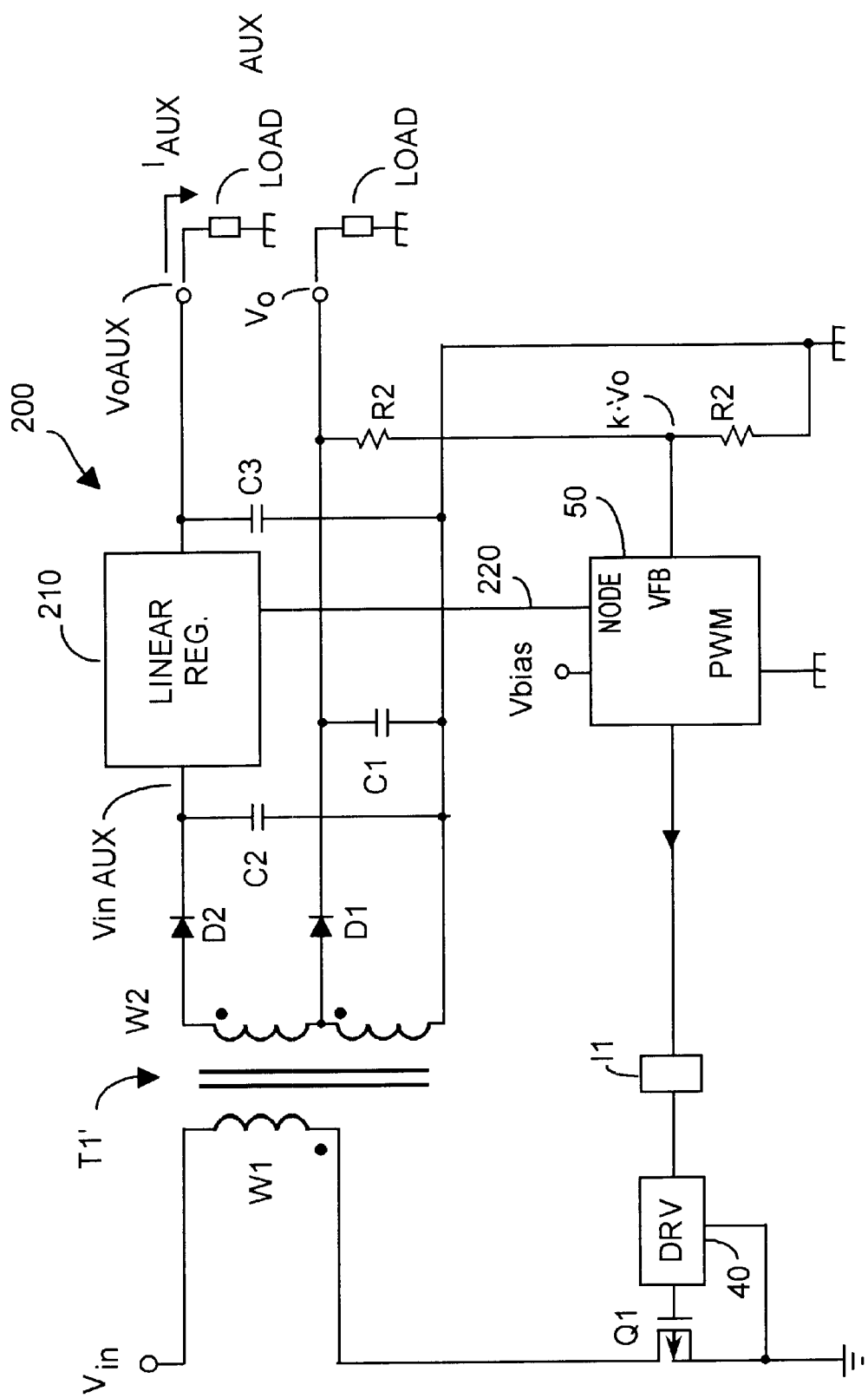
FIG. 2A is a block diagram of a voltage converter system with a post-linear regulator with feedback from the regulator to the converter PWM, according to the present invention.

The block diagram of FIG. 2A is similar to the generic diagram of FIG. 1A, but for the use of feedback 220 from linear regulator 210 to a node (NODE) on PWM 50. In FIG. 1A, feedback 70 from post-linear regulator 60 was internal to the regulator, went from the VoAUX node to the error amplifier 80 within the linear regulator, and did not result in regulation of the VinAUX potential. But in FIG. 2A, feedback 220 goes from the VoAUX node to a node (NODE) of the same PWM 50 that provides output-to-input feedback control over voltage at the Vo node. The NODE on PWM 50 to which feedback loop 220 from regulator 210 may be coupled can be one or more PWM input nodes, such as COMP₁ SoftStart, VFB₁ among other nodes. Those skilled in the art will recognized that VFB is an input node of an error amplifier within the PWM, COMP is an output node of that amplifier, and SoftStart is a node that ensures smooth Vo power-up.

Figure 2B:
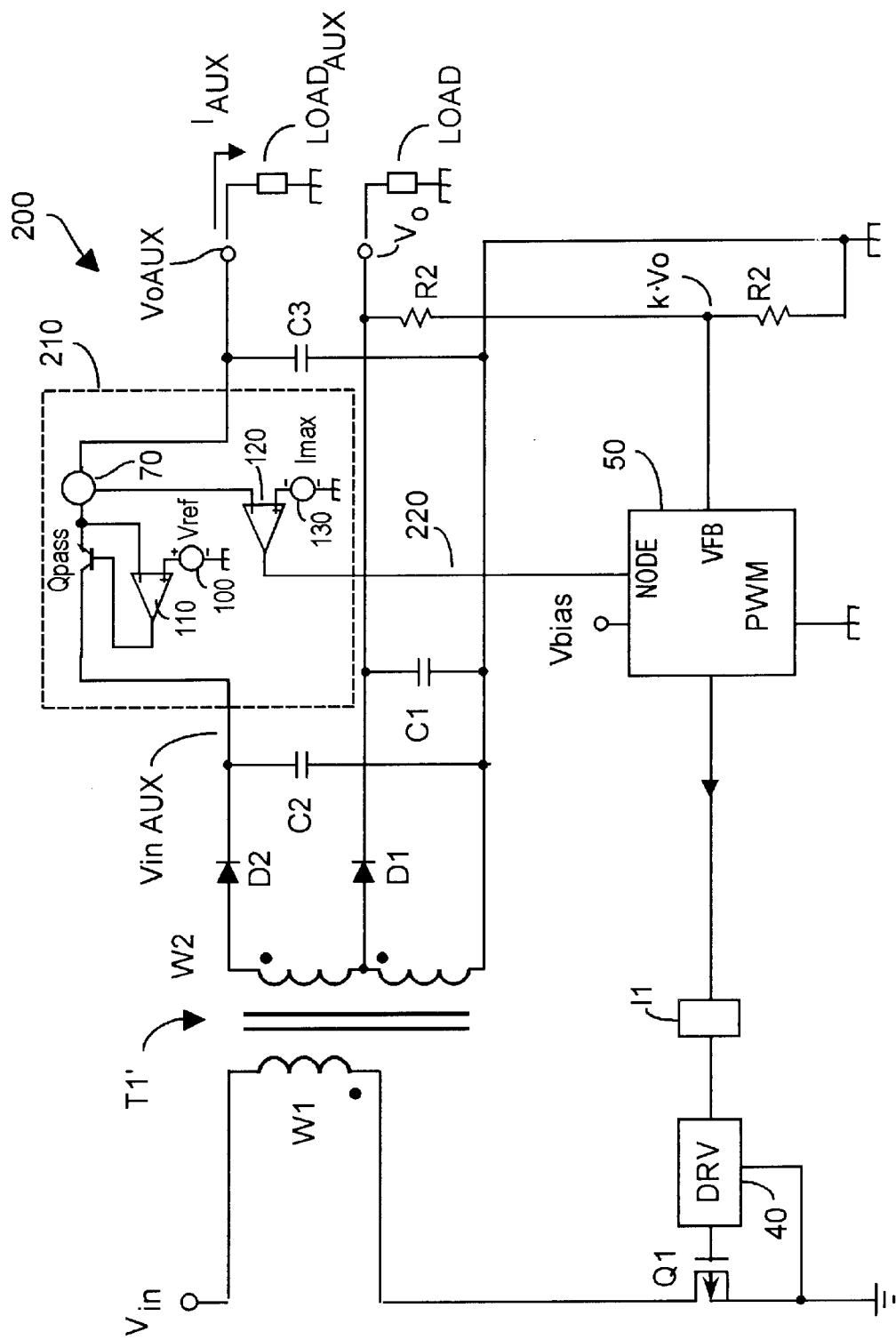
FIG. 2B is a block diagram showing the system of FIG. 2A with details of an exemplary post-linear regulator, according to the present invention.

With little modification, regulator 210 may be the same as linear regulator 60 in FIG. 1A, but for the nature of feedback 220 to PWM 50. As used herein, the signal from post-linear regulator 210 delivered to the PWM node via feedback 220 may be referred to as a command signal. In FIG. 2B, it is understood that converter system 200 is generic, and may isolation-providing or otherwise. Further, although system 200 is shown as a DC:DC converter, the present invention may be practiced with converter system 200 that is AC:DC, AC:AC, or DC:AC.

In the configuration of FIG. 2B, as current through the regulator pass element $Q_{pass}$ (shown as an NPN bipolar transistor) increases, rather than merely try to limit the maximum current $I_{AUX}$ (as in prior art configuration FIG. 1A), the present invention uses feedback 220 to cause PWM 50 to limit the magnitude of the voltage at the VinAUX node, which limit will also affect potential at the VoAUX node (as well as the Vo node).

The VoAUX node current is coupled via feedback loop 220 to a desired input NODE (e.g., COMP, SoftStart, VFB) of PWM 50 such that increased current $I_{AUX}$ passing through $Q_{pass}$ and sensed by sensor 70 and will, via feedback loop 220, command PWM 50 to reduce duty cycle to driver circuit 40, and thus to switch Q1. The decreased duty cycle at Q1 will reduce the magnitude of voltage at the VinAUX node, and thus also at the VoAUX node, and the Vo node.

When excessive current, relative to threshold current $I_{max}$, flows through the post-linear regulator pass element $Q_{pass}$, $Q_{pass}$ is caused to operate at saturation or very close to saturation mode. Ideally $Q_{pass}$ is operated in saturation mode when the threshold current is exceeded but in practice $Q_{pass}$ may operate in less than full saturation mode. As used herein "near saturation mode" will be understood to include saturation mode as well as operation close to saturation mode, e.g., where voltage drop across $Q_{pass}$ is reasonably close to the small voltage drop at full saturation. As a result, the voltage across the input-to-output terminals of pass device $Q_{pass}$ is minimal, e.g., for a bipolar transistor about 0.2 VDC saturation level collector-emitter voltage Vce. Thus, even if the maximum current drawn from the VoAUX node is on the order of several amperes, the voltage drop across $Q_{pass}$ will be perhaps 0.2 VDC and only a few watts will have to be dissipated by $Q_{pass}$. Note that in the worst case condition of a short-circuit load at the VoAUX node, dissipation across $Q_{pass}$ is actually at a minimum due to operation of $Q_{pass}$ in saturation mode when $I_{max}$, is exceeded.

If the load at the VoAUX node is increased in impedance, or a short-circuit load removed, the current $I_{AUX}$ drawn from the VoAUX node will fall below the threshold current. When such sub-threshold levels of current pass through the linear regulator, the feedback signal in loop 220 from the regulator is essentially nil, and PWM 50 will respond to conditions at the Vo node as fed to the VFB node, but need not respond to a signal at the NODE input of the PWM reflecting the state of sub-threshold $I_{AUX}$ current. However if excess $I_{AUX}$ current against flows through $Q_{pass}$ and sensor 70, feedback from the post-liner regulator via loop 220 will cause PWM 50 to reduce the VinAUX node potential, and thus also VoAUX node potential and Vo node potential.

It will be appreciated that the self-protecting nature of post-linear regulator 210 exists even if the regulator components are discrete, as opposed to fabricated on a common IC die. As noted, in the worst case, thermal dissipation of pass element $Q_{pass}$ is essentially the product of the pass element's saturation voltage (e.g., Vce sat) and the maximum $I_{AUX}$, which product is minimized because the pass element is operated in saturation mode. It is understood that substantially all current passing through pass element $Q_{pass}$ will be delivered into a load (e.g., $LOAD_{AUX}$) coupled to the VoAUX node, as essentially zero current is drawn by error amplifier 80 in regulator 60.

Modifications and variations may be made to the disclosed embodiments without departing from the subject and spirit of the invention as defined by the following claims.

What is claimed is:

1. A converter system including:
    a transformer with a primary winding switchably coupleable to conduct current from a source of Vin, and with at least one secondary winding providing a Vo node and a VoAUX node;
    a switch coupleable to said primary winding;
    a pulse width modulator (PWM) having an input node coupled to sense potential at said Vo node and having an output node coupled to control duty cycle of said switch at least partially in response to said potential at said Vo node; and
    a linear regulator, coupled in series between said secondary winding and said VoAUX node, said linear regulator outputting a command signal to a node on said PWM when current delivered from said VoAUX node exceeds a threshold level.

2. The system of claim 1, wherein said linear regulator includes:
    a pass element through which substantially all current delivered from said VoAUX node passes; and
    means for operating said pass element in at least near saturation mode when magnitude of current through said pass element exceeds a threshold magnitude.

3. The system of claim 1, wherein said node on said PWM includes at least one node selected from a group consisting of (a) COMP node, (b) SoftStart node, and (c) VFB node.

4. The system of claim 1, wherein said linear regulator includes:
    a pass element through which substantially all current delivered from said VoAUX node passes;
    means for sensing said current and for generating said command signal when sensed said current exceeds a threshold magnitude.

5. The system of claim 4, wherein said means for sensing and for generating includes at least one of (a) a reference current source proportional to said threshold magnitude, (b) a voltage reference proportional to a nominal value of potential at said Vo node, (c) a comparator coupled between a reference current source proportional to said threshold magnitude and coupled to sense said current delivered from said VoAUX node, and (d) a comparator coupled between a voltage reference proportional to a nominal value of potential at said Vo node and to potential at said VoAUX node.

6. The system of claim 2, wherein said pass element is a semiconductor.

7. The system of claim 2, wherein said pass element is a transistor, and said means for operating results in least dissipation across said transistor when current delivered from said VoAUX mode is maximum.

8. The system of claim 1, wherein said converter is a DC:DC converter.

9. The system of claim 1, wherein said converter is an AC:DC converter.

10. The system of claim 1, wherein said converter is a DC:AC converter.

11. The system of claim 1, wherein said converter is an AC:AC converter.

12. A method of protecting at least one output node in a voltage converter that has a transformer with a primary winding switchably coupleable to conduct current from a source of Vin, the transformer further including at least one secondary winding having a Vo node and a VoAUX node, said converter further having a pulse width modulator (PWM) having an input node coupled to sense potential at said Vo node and having an output node coupled to control duty cycle of current switchably conducted through said primary winding, the method comprising the following steps:

(A) coupling a post-linear regulator in series between said secondary winding and said VoAUX node, and providing a feedback path between said linear regulator and a node of said PWM;

(B) sensing current flow through said linear regulator to a load coupled to said VoAUX node; and (C) commanding said PWM to reduce duty cycle of current flow through said primary winding when current flow sensed at step (B) exceeds a threshold magnitude.

13. The method of claim 12, further including providing said postlinear regulator with a solid-state pass element through which substantially all current flowing to a load coupled to said VoAUX node passes; and causing said solid-state pass element to at least approach saturation mode when step (B) determines that sensed said current exceeds said threshold magnitude.

14. The method of claim 12, wherein said converter is a DC:DC converter.

15. The method of claim 12, wherein said converter is an AC:DC converter.

16. The method of claim 12, wherein said converter is a DC:AC converter.

17. The method of claim 12, wherein said converter is an AC:AC converter.

18. The method of claim 12, wherein said node on said PWM includes at least one node selected from a group consisting of (a) VFPA, (b) COMP, and (c) SoftStart.

19. The method of claim 12, wherein said converter is an isolating converter.

20. The method of claim 12, wherein step (A) includes operating said post-linear regulator in at least near saturation mode when current sensed at step (C) exceeds said threshold, wherein thermal dissipation through said post-linear regulator is minimized when current flow therethrough is maximized.

* * * * *